United States Patent [19]

David et al.

[11] Patent Number: 4,965,057

[45] Date of Patent: Oct. 23, 1990

[54] PROCESS FOR PRODUCING MORPHOLOGICALLY IMPROVED CERIC OXIDE PARTICULATES

[75] Inventors: Claire David, Paris; Francoise Seon, Montreuil, both of France

[73] Assignee: Rhone-Poulenc Chimie, Courbevoie, France

[21] Appl. No.: 211,896

[22] Filed: Jun. 27, 1988

[30] Foreign Application Priority Data

Jun. 26, 1987 [FR] France ............... 87 09020

[51] Int. Cl.$^5$ ............................................. C01F 17/00
[52] U.S. Cl. .................... 423/263; 423/21.1; 423/21.5
[58] Field of Search .............. 423/21.1, 21.5, 263, 423/592

[56] References Cited

U.S. PATENT DOCUMENTS

| | | | |
|---|---|---|---|
| 2,327,992 | 8/1943 | Blumenfeld | 423/21.1 |
| 4,051,219 | 9/1977 | Hafner | 423/263 |
| 4,231,997 | 11/1980 | Pitts | 423/263 |
| 4,601,755 | 7/1986 | Mélard et al. | 423/263 |
| 4,647,401 | 3/1987 | Gradeff et al. | 423/21.1 |
| 4,661,330 | 4/1987 | Chane-Ching et al. | 423/263 |
| 4,663,137 | 5/1987 | Chane-Ching et al. | 423/263 |
| 4,786,325 | 11/1988 | Melard et al. | 106/3 |
| 4,832,749 | 5/1989 | Vallvey et al. | 106/433 |
| 4,857,296 | 8/1989 | Brunelle et al. | 423/21.1 |
| 4,859,432 | 8/1989 | David et al. | 423/21.1 |

FOREIGN PATENT DOCUMENTS

| | | |
|---|---|---|
| 0153227 | 8/1985 | European Pat. Off. . |
| 0207857 | 1/1987 | European Pat. Off. . |
| 0239477 | 9/1987 | European Pat. Off. . |
| 2570087 | 3/1986 | France . |
| 2583034 | 12/1986 | France . |
| 38182 | 1/1960 | Luxembourg . |

*Primary Examiner*—Theodore Morris
*Assistant Examiner*—Paige C. Harvey
*Attorney, Agent, or Firm*—Burns, Doane, Swecker & Mathis

[57] ABSTRACT

Morphologically improved ceric oxide particulates having a grain size distribution such that the mean diameter of the aggregates thereof ranges from 0.2 to 1 µm, are conveniently prepared by (i) hydrolyzing an aqueous solution of a cerium (IV) salt in an acid medium, (ii) adding an aqueous colloidal dispersion of a cerium (IV) compound to the product of step (i), (iii) separating the precipitate from step (ii), and then (IV) heat treating said separated precipitate, advantageously by calcination at elevated temperatures.

36 Claims, No Drawings

PROCESS FOR PRODUCING MORPHOLOGICALLY IMPROVED CERIC OXIDE PARTICULATES

BACKGROUND OF THE INVENTION

1. Field of the Invention:

The present invention relates to the production of novel morphologically improved ceric oxide particulates, and, more especially, to the production of novel ceric oxide particulates having a controlled grain size distribution.

2. Description of the Prior Art:

For numerous applications, such as catalysis, ceramics, luminescence, etc., an urgent demand currently exists for a ceric oxide powder with a controlled morphology, in particular a ceric oxide with a fine and restricted grain size distribution.

In published French Application No. 2,583,034 a ceric oxide is described having a low specific surface of less than 10 m$^2$/g (measured after calcination at a temperature of from 400° to 600° C.) and dimensions of the aggregates of from 0.2 to 5.0 μm. The size of said aggregates, expressed as the mean diameter thereof, varies from 0.5 to 1.5 μm; the mean diameter being a diameter such that 50% by weight of the aggregates have a diameter larger or smaller than the mean diameter. However, it is noted that the final product ceric oxide has a relatively broad grain size distribution.

SUMMARY OF THE INVENTION

Accordingly, a major object of the present invention is the provision of improved ceric oxide particulates having a controlled grain size distribution.

Another object of this invention is the provision of a process for the production of ceric oxide particulates having a fine and restricted grain size distribution.

Another object of this invention is the provision of novel submicronic ceric oxide particulates.

Briefly, the present invention features the preparation of a ceric oxide having a controlled grain size distribution, comprising (i) hydrolyzing an aqueous solution of a cerium (IV) salt in an acid medium, in the presence of an aqueous colloidal dispersion of a cerium (IV) compound, (ii) separating the precipitate which results, and then (iii) heat treating said precipitate.

DETAILED DESCRIPTION OF THE PREFERRED EMBODIMENTS OF THE INVENTION

More particularly according to the present invention, it has now unexpectedly been determined that it is possible to produce ceric oxide particulates by a process enabling control over the size of the particles and their distribution, by employing, as the regulator of the growth of the particles, a colloidal dispersion of a cerium (IV) compound, referred to hereinafter simply by the term "sol".

Indeed, it has now unexpectedly and surprisingly been discovered that the morphological characteristics of the ceric oxide produced depend on the characteristics of the aqueous colloidal dispersion of the cerium (IV) compound and that the grain size distribution of the final product ceric oxide may be controlled by varying, in particular, the morphology (in particular the size) of the colloids.

For the sake of clarity, the process for producing ceric oxide particulates by the acid hydrolysis of a cerium (IV) salt will first be described, and subsequently, the means enabling the production of a ceric oxide, the particle size distribution of which is controlled, will be described, said means being related to the selection of the characteristics of the cerium sol.

In the first stage, the hydrolysis of an aqueous solution of a cerium (IV) salt is carried out, over the course of which the sol of a cerium (IV) compound is introduced.

The aqueous solution of cerium (IV) subjected to hydrolysis may be an aqueous solution of ceric nitrate. The solution may contain, without causing any particular difficulty, cerium in the cerous state, but it is desirable, in order to have a good precipitation yield, that it contain at least 85% cerium (IV).

The cerium salt solution is selected such that it contains no impurities which may be transferred into the final product. It is thus advantageous to use a cerium salt solution having a degree of purity higher than 99%.

The concentration of the cerium salt solution is not critical according to the invention. When expressed in terms of cerium (IV), it may range from 0.3 to 3 moles per liter, preferably from 0.5 to 1.5 moles/liter.

As the raw starting material, a ceric nitrate solution obtained by the action of nitric acid on a hydrated ceric oxide may be used; it is prepared in a conventional manner, by the reaction for example of a cerous salt solution . - 3 with cerous carbonate and a ammonia solution, in the presence of an oxidizing agent, preferably hydrogen peroxide.

The ceric nitrate solution produced by the electrolytic oxidation of a cerous nitrate and described in published French Application No. 2,570,087 (French Patent No. 84/13641) is a preferred starting material.

The hydrolysis medium includes water, the nature of which is not critical, and which preferably is distilled or deionized water.

The acidity may be introduced by the addition of an inorganic acid, preferably nitric acid. The acid may be concentrated or diluted, for example to 10$^{-2}$N.

It may also originate from a ceric nitrate solution which may be slightly acidic, having a normality ranging from 0.01 N to 5 N, preferably from 0.1 N to 1 N.

The quantity of H$^+$ ions introduced for the hydrolysis reaction is such that the molar ratio [H$^+$]/[Ce$^{IV}$ eq.] is higher than or equal to 0 and less than or equal to 3.

A molar ratio of [H$^+$]/[Ce$^{IV}$ eq.] ranging from 0 to 2.0 is preferred.

The proportion between the aqueous solution of the cerium (IV) salt and the hydrolysis medium (essentially water) is such that the final equivalent concentration in cerium (IV) ranges from 0.1 mole/liter to 1 mole/liter, preferably from 0.2 to 0.6 mole/liter.

The final equivalent concentration in cerium (IV) is defined by the following equation:

$$[Ce^{IV} \text{ eq.}] = ([Ce^{IV}] \times V')/(V+V')$$

wherein:

[Ce$^{IV}$] is the concentration in moles/liter of the cerium (IV) salt solution;

V is the volume of water ultimately added to the acid;

V' is the volume of the cerium (IV) solution.

The hydrolysis of the cerium salt under the aforedescribed condition is carried out at a temperature of from 70° to 120° C. and preferably at the reflux temperature of the reaction medium, which is around 100° C.

It is easier to conduct the reaction at the reflux temperature, which is readily controlled and reproduced.

The hydrolysis stage may be conducted according to any one of a number of different embodiments. For example, the cerium (IV) salt solution may be added all at once, gradually or continuously to the water optionally containing the acid and heated to the reaction temperature, or conversely.

The process may also be carried out continuously. For this purpose, the cerium (IV) salt solution is mixed simultaneously and continuously with the hydrolysis medium and the mixture heated continuously to the selected reaction temperature.

In a preferred embodiment of the invention, the cerium (IV) salt solution and the hydrolysis medium are mixed together and the mixture is heated under agitation to the reaction temperature.

Characteristically according to this invention, during the hydrolysis stage an aqueous sol of a cerium (VI) compound is introduced.

Suitable such aqueous sols of a cerium (IV) compound have the following general formula (I):

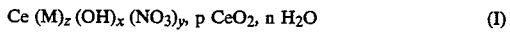

$$\text{Ce (M)}_z\text{(OH)}_x\text{(NO}_3\text{)}_y, p\text{ CeO}_2, n\text{ H}_2\text{O} \qquad (I)$$

wherein

M is an alkali metal or a quaternary ammonium radical;

z ranges from 0 to 0.2;

y ranges from 0 to 1.5;

x is such that $x=4-y+z$;

p ranges from 0 to 2.0; and n ranges from 0 to approximately 20.

The concentration of the cerium (IV) compound in the sol is not critical. When expressed in terms of $CeO_2$ values, it ranges from 0.1 to 1.5 mole/liter and preferably from 0.5 to 1 mole/liter.

The proportion of cerium (IV) in the colloidal form is higher than 95%, but the invention does not exclude a sol in which cerium (IV) is present in the ionic state. Preferably, a cerium proportion of from 99 to 100% is used.

The size of the colloids present in the sol may vary over a rather broad range. Generally, the mean hydrodynamic diameter of the colloids, determined by the quasi-elastic diffusion of light, by the method described by Michael L. McConnell, in *Analytical Chemistry*, 53, No. 8 1007 A (1981), may range from 50 Å to 2,000 Å.

The quantity of the aqueous sol of a cerium (IV) compound, expressed relative to the quantity of the cerium (IV) salt expressed as $CeO_2$, may range from 0.1 to 20% by weight; the upper limit is not critical, but there is no advantage in using a larger amount.

The aqueous sol of the cerium (IV) compound is preferably in a proportion of 1 to 5% by weight.

Consistent with the process of the invention, said sol is introduced over the course of the hydrolysis of the cerium (IV) salt, but prior to the onset of the precipitation of the ceric hydrate.

In a preferred manner, the aqueous sol of the cerium (IV) compound is added to the reaction medium heated to a temperature of at least 70° C., preferably from 75° C. to 100° C.

In the case in which the temperature of the addition of the aqueous sol is less than the hydrolysis reaction temperature, the rise in temperature is continued.

Once the reaction temperature is attained, it is maintained for from 2 to 8 h and preferably from 3 to 6 h. The formation of a precipitate is observed beginning with the introduction of the aqueous cerium sol.

The yield of the hydrolysis reaction depends on the final equivalent concentration of cerium (IV), the molar ratio $[H^+]/[CE^{IV}\text{ eq.}]$ and the quantity of the colloids introduced. It increases with the dilution of the reaction medium, a declining molar ratio $[H^+]/[CE^{IV}\text{ eq.}]$ and increasing quantities of the colloids. As specific examples, it is noted that for a molar ratio $[H^+]/[CE^{IV}\text{ eq.}]$ equal to 1.5, a quantity of colloids of 3%, i.e., an aqueous dispersion of a cerium (IV) compound of 1 mole/liter and employing colloids having a mean diameter of 500 Å, and for final equivalent concentration of 0.23 M, 0.35 M and 0.46 M, the respective yields are 96%, 80% and 30%.

The second stage of the process entails separating the precipitate obtained, by conventional solid/liquid separation methods: filtration, decantation, centrifuging or drying.

This separation is carried out generally at ambient temperature.

The product obtained after separation may be directly subjected to the calcination operation, or a preliminary drying may first be carried out.

The drying conditions may vary over wide limits. Thus, the temperature may range from 15° to 100° C., preferably from ambient temperature to 100° C. The duration of drying preferably ranges from 5 to 48 h in order to obtain a dry product (n=0). The drying operation may be carried out in air or under reduced pressure, for example 1 to 100 mm of mercury (133.322 pa and 13332.2 Pa).

A preferred embodiment of the invention includes subjecting the product separated to a lyophilization treatment. It is effected by the rapid freezing of the product at a temperature preferably ranging from $-10°$ C. to $-30°$ C., followed by sublimation under reduced pressure, which is not critical and preferably ranges from 0.001 to 0.5 atmosphere. It should be appreciated that the lyophilized material is not entirely dry, n ranging from approximately 5 to 10.

It is more favorable to conduct a lyophilization than a drying operation, as the product obtained after calcination does not tend to lump, as does the product without lyophilization. In such a case, it is desirable to break up the lumps, either manually or by the disintegration of the agglomerates by ultrasound generated by any type of ultrasonic apparatus.

In the last stage of the process, the optionally dried product is subjected to calcination at a temperature of from 300° to 1,000° C., but preferably from 35° to 800° C. The duration of such treatment ranges from 30 min to 10 h, preferably from 4 to 8 h.

As mentioned above, the morphology of the colloids of the cerium (IV) compound sol gives rise to a certain morphology of the final product ceric oxide, and affects in particular its grain size distribution.

In another embodiment of the invention, the aqueous sol of the cerium (IV) compound suitable for producing the desired ceric oxide is defined as having a mean diameter of its particles or aggregates that is submicronic, i.e., less than 1 μm.

Exemplary starting materials suitable for producing such a ceric oxide are those sols described in EP 0,239,477 and prepared by the dispersion of water of a cerium (IV) compound having the general formula (II):

$$Ce(OH)_x(NO_3)_y, pCeO_2, nH_2O \quad (II):$$

in which:

x is such that $x = 4 - y$;

y ranges from 0.35 to 1.5;

p is higher than or equal to 0 and less than or equal to 2.0; and n is higher than or equal to 0 and less than or equal to about 20.

The sol has colloid sizes that may vary over a wide range of from 100 to 1000 Å.

By basification until pH of 3.0 is obtained, coarser colloids may be obtained having a hydrodynamic diameter ranging from 300 to 2,000 Å.

The sols having the aforementioned colloid sizes are produced by dispersing in water the cerium (IV) compound of formula (II), which is directly dispersible in water. The compound is dispersed under agitation in an aqueous medium, or in a slightly acidic medium, such as to provide a sol having a pH of from 1 to 2.5.

The compound of cerium (IV) of formula (II) is prepared by a process which, in a first stage, comprises hydrolyzing an aqueous solution of a cerium (IV) salt in an acid medium; in a second stage, of separating the precipitate which results; and, in a third stage, which is not compulsory, of heat treating said precipitate.

In the first state, the hydrolysis of an aqueous solution of a cerium (IV) salt is carried out. It is conducted under the conditions described for the hydrolysis stage of the process of the invention. The previously defined characteristics of the initial solutions, the cerium (IV) salt solution and the hydrolysis medium, together with the techniques of operation, are applicable here also.

The quantity of $H^+$ ions introduced by the hydrolysis reaction is such that the molar ratio $[H^+]/[Ce^{IV} eq.]$ is higher than or equal to 0 or less than or equal to 3, and preferably ranges from 0.4 to 2.5.

Over the course of the hydrolysis reaction, the formation of a precipitate is observed. The duration of the reaction may range from 2 to 8 h, preferably from 3 to 6 h.

The other stages of the process for the preparation of the cerium (IV) compound that is dispersible in water, include separating the precipitate by conventional methods of solid/liquid separation, then optionally subjecting the precipitate to a heat treatment.

This operation is optional, as it is found that the precipitate separated after the first stage of hydrolysis is directly dispersible in water and that it is possible to directly obtain an aqueous sol by suspending the separated precipitate in water, without the need for drying. In effect, a drying stage is not indispensable and the elimination of all of the free water is not required.

The drying conditions may vary within over limits. Thus, the temperature may range from 15° to 100° C., preferably from ambient temperature to 50.C. The duration of drying preferably ranges from 5 to 48 h in order to obtain a dry product (n=0). The drying operation may be carried out under reduced pressure, for example between 1 and 100 mm of mercury (133.322 Pa and 13332.2 Pa).

Regardless of the degree of hydration of the cerium (IV) compound corresponding to the formula (II), a cerium (IV) compound directly dispersible in water is produced, which, after being dispersed in water, provides a sol having colloids with a hydrodynamic diameter ranging from 100 to 1,000 Å.

According to the present invention, the introduction of an aqueous sol of a cerium (IV) compound over the course of the precipitation of a cerium hydrate obtained by hydrolysis in an acid medium results in the production of a ceric oxide having novel morphological characteristics.

Indeed, the use of an aqueous sol as defined above makes it possible to produce a ceric oxide having a fine and restricted or predetermined grain size distribution: the mean diameter of the aggregates ranges from 0.2 to 1 μm and preferably from 0.2 to 0.4 μm.

All of the results of grain size analyses reported herein were determined by a sedimentation method as hereinafter described.

The size o the aggregates ranges from approximately 0.1 to 2 μm; the grain size fraction larger than 2 μm is less than 0.5%.

The monodispersed nature of the size distribution of the aggregates is shown by the dispersion index defined by the relation $(d_{84} - d_{16})/2d_{50}$, which is within the range of 0.3 to 0.5 and preferably 0.3 to 0.4.

It is surprising and unexpected that a ceric oxide this fine may be produced without using a grinding operation.

X-ray diffraction analysis shows that it is a crystalline material having a $CeO_2$ type crystalline phase, with a size parameter ranging from 5.41 Å to 5.44 Å and a crystallization proportion most typically ranging from 75 to 85%.

By way of example, in the crystallized fraction, the size of the crystallites of an oxide obtained after calcination at 600° C. is 80 to 100 Å and after calcination at 1,000° C., around 500 Å.

In order to further illustrate the present invention and the advantages thereof, the following specific examples are given, it being understood that same are intended only as illustrative and in nowise limitative. In said examples to follow, all parts and percentages are given by weight.

Also in said examples to follow, the grain size analysis was carried out using SEDIGRAPH 5000D instrument.

This apparatus measures the rate of sedimentation of the particles in suspension and displays the results automatically in a distribution of cumulative percentages as a function of equivalent spherical diameters (based on Stokes's law).

The apparatus determines, by means of a very fine X-ray beam, the concentration of particles retained in suspension at different heights of sedimentation, as a function of time. The logarithm of the intensity of the X-ray is generated electronically and recorded and then displayed linearly in "cumulative percentages" (in smaller than) on the Y axis of an XY recorder. To limit the time required for the analysis, the sedimentation cell is constantly in motion, such that the depth of the sedimentation cell is inversely proportional to time. The motion of the cell is synchronized with the X axis of the recorder in order to indicate directly the equivalent spherical diameter corresponding to the time elapsed at a given depth of sedimentation, with the dimension information being presented on a logarithmic chart with 3 modules.

For every oxide powder, $d_{50}$, $d_{16}$, $d_{84}$ were determined, which made it possible to calculate the index of dispersion defined above.

EXAMPLE 1

(a) Preparation of an aqueous sol of a cerium IV compound:

Into a three-necked, 2 liter flask equipped with a thermometer, an agitator, a system for the introduction of reagents, a reflux condenser and a heating device, the following were introduced at ambient temperature:

(i) 1,081 cm$^3$ distilled water, (ii) 418 cm$^3$ of a solution of ceric nitrate prepared by electrolysis according to FR 2,570,087 and containing 1.25 moles/liter cerium (IV), 0.05 mole/liter cerium (III) and having a free acidity of 0.5 N.

In the hydrolysis medium, the cerium (IV) concentration, expressed as CeO$_2$, was equal to 60 g/liter and the molar ratio $[H^+]/[Ce^{IV} eq.]$ was equal to 0.4.

The reaction medium was maintained under agitation and a reflux for 4 h.

Filtration was carried out on sintered glass (porosity No. 3). 100 g of a yellow precipitate were recovered. 57 g of said precipitate were added to distilled water, an amount sufficient to provide a volume of 200 cm$^3$.

A sol having a cerium (IV) concentration, expressed in CeO$_2$, of 172 g/liter (1M) and having a mean diameter of colloids of 550 Å, was obtained.

(b) Preparation of a ceric oxide:

In an apparatus such as described in (a), the following were introduced at ambient temperature:

(i) 1,081 cm$^3$ distilled water;

(ii) 418 cm$^3$ of the ceric nitrate solution specified in (a).

The mixture was heated under agitation.

When the temperature in the reactor attained 75°–80° C., 16 cm$^3$ of a cerium (IV) compound prepared as in (a), were added.

In the reaction medium, the cerium (IV) concentration, expressed in CeO$_2$, was equal to 61.8 g/l and the molar ratio $[H^+]/Ce^{IV} eq.]$ was equal to 0.4.

The reaction medium was maintained under agitation and at reflux for 4 h.

Filtration was on sintered glass No. 4.

A yield of 95% of the hydrolysis reaction was determined.

The product obtained was dried by lyophilization for 24 h in a CHRIST 1060 type lyophilizer apparatus.

The lyophilized material was placed in an alumina boat and calcined in a muffle furnace for 6 h at 600° C. 83 g of a yellow precipitate were recovered.

The ceric oxide obtained had the following characteristics:

(1) % CeO$_2$=98%
(2) Degree of crystallization approximately 80%
(3) Mean diameter of aggregates: 0.3 to 0.4 μm
(4) Dispersion index: $(d_{84}-d_{16})/2d_{50}=0.32$

EXAMPLE 2

(a) Preparation of an aqueous sol of a cerium (IV) compound:

Into the three-necked, 2 liter flask equipped with a thermometer, an agitator, a system for the introduction of reagents, a reflux condenser and a heating device, the following were introduced at ambient temperature:

(i) 1,081 cm$_3$ 0.289 N nitric acid; (ii) 418 cm$_3$ of a ceric nitrate solution prepared by electrolysis according to FR 2,570,987 and containing 1.25 moles/liter cerium IV, 0.05 mole/liter cerium (III) and having a free acidity of 0.5 N.

In the hydrolysis medium, the cerium (IV) concentration, expressed as CeO$_2$, was equal to 60 g/liter and the molar ratio $[H^+]/[Ce^{IV} eq.]$ was 1.5.

The reaction medium was maintained under agitation and at reflux for 4 h.

Filtration was on sintered glass (porosity No. 3).

80 g of a yellow precipitate were recovered.

57 g of said precipitate were added to distilled water, present in an amount sufficient to provide a volume of 200 cm$^3$.

A sol having a cerium (IV) concentration, expressed as CeO$_2$, of 172 g/liter (1 M) and having a mean diameter of colloids of 600 Å, was produced.

(b) Preparation of ceric oxide:

Into an apparatus as described in (a), at ambient temperature, the following were introduced:

(i) 1,081 cm$^3$ distilled water;

(ii) 418 cm$^3$ of the ceric nitrate solution characterized in (a).

The mixture was heated under agitation.

When the temperature in the reactor attained 85°-90° C., 16 cm$^3$ of the aqueous sol of the cerium (IV) compound prepared according to (a), were added.

In the reaction medium, in the concentration in cerium (IV), expressed as CeO$_2$, was equal to 61.8 g/l and the molar ratio $[H^+]/[CE^{IV} eq.]$ was 1.5.

The reaction medium was maintained under agitation and at reflux for 4 h.

Filtration was on sintered glass No. 4.

A yield of the hydrolysis reaction of 75% was determined.

The product obtained was dried by lyophilization for 24 h in a CHRIST 1060 type lyophilizer.

The lyophilized material was placed in an alumina boat and calcined in a muffle furnace for 6 h at 600° C. 72 g of a yellow precipitate were recovered.

The ceric oxide obtained had the following characteristics:

(1) % CeO$_2$=98%
(2) Degree of crystallization about 90%
(3) Mean diameter of aggregates: 0.3 μm
(4) Dispersion index: $(d_{84}-d_{16})/2d_{50}=0.4$.

EXAMPLE 3

(a) Preparation of an aqueous sol of a cerium (IV) compound:

Into an apparatus as described in Example 1, the following were introduced at ambient temperature:

(i) 1,220 cm$^3$ distilled water:

(ii) 279 cm$^3$ of a ceric nitrate solution prepared by electrolysis according to FR 2,570,087 and containing 1.25 moles/liter cerium (IV), 0.05 mole/liter cerium (III) and having a free acidity of 0.5 N.

In the hydrolysis medium, the concentration in cerium (IV), expressed as CeO$_2$, was equal to 40 g/liter and the molar ratio $[H^+]/[Ce^{IV} eq.]$ was 0.4.

The reaction medium was maintained under agitation and at reflux for 4 h.

Filtration was on sintered glass (porosity No. 3). 65 g of a yellow precipitate were recovered. 57 g of the said precipitate were added to distilled water, present in an amount sufficient to provide a volume of 200 cm$^3$.

A sol having a cerium (IV) concentration, expressed as CeO$_2$, of 172 g/liter (1M) and having a mean colloid diameter of 220 Å, was produced.

(b) Preparation of the ceric oxide:

Into an apparatus as described in Example 1, the following were introduced at ambient temperature:

(i) 1,081 cm$^3$ 0.289 N nitric acid,
(ii) 418 cm$^3$ of the ceric nitric solution characterized in (a).

The mixture was heated under agitation.

When the temperature in the reactor attained 85°–90° C., 16 cm$^3$ of the aqueous sol of a cerium (IV) compound prepared according to (a) were added.

The reaction medium was maintained under agitation and at reflux for 4 h.

In the reaction medium, the concentration in cerium (IV), expressed as CeO$_2$, was equal to 62 g/l and the molar ratio [H+]/[Ce$^{IV}$ eq.] was 1.5.

Filtration was on sintered glass No. 4.

A yield of the hydrolysis reaction of 75% was determined.

The product obtained was dried by lyophilization for 24 h in a CHRIST type 1060 lyophilizer.

The lyophilized material was placed into an alumina boat and calcined in a muffle furnace for 6 h at 600° C.

70 g of a yellow precipitate were recovered.

The ceric oxide obtained had the following characteristics:
(1) % CeO$_2$=98%
(2) Mean diameter of the aggregates: 0.2μm
(3) Dispersion index: (d$_{84}$−d$_{16}$)/2d$_{50}$=0.3.

EXAMPLE 4

(a) Preparation of an aqueous sol of a cerium (IV) compound;

Into an apparatus as described in Example 1, at ambient temperature the following were introduced
(i) 1,220 cm$^3$ 0.315 N nitric acid;
(ii) 279 cm$^3$ of a ceric nitrate solution prepared by electrolysis according to FR 2,570,087 and containing 1.25 moles/liter cerium (IV), 0.05 mole/liter cerium (III) and having a free acidity of 0.5 N.

In the hydrolysis medium, the concentration in cerium (IV), expressed as CeO$_2$, was equal to 40 g/liter and the molar ratio [H+]/[Ce$^{IV}$ eq.] was 1.5.

The reaction medium was maintained under agitation and at reflux for 4 h.

Filtration was on sintered glass (porosity No. 3). 58 g of a yellow precipitate were recovered. 57 g of said precipitate were added to distilled water, present in an amount sufficient to provide a volume of 200 cm$^3$.

A sol having a concentration in cerium (IV), expressed as CeO$_2$, of 172 g/liter (1M) and having a mean colloid diameter of 500 Å, was produced.

(b) Preparation of ceric oxide:

Into an apparatus described in Example 1, the following were introduced at ambient temperature:
(i) 1,081 cm$^3$ 0.289 N nitric acid;
(ii) 418 cm$_3$ of the ceric nitrate solution characterized in (a).

The mixture was heated under agitation.

When the temperature in the reactor attained 85°–90° C., 16 cm$^3$ of the aqueous sol of cerium (IV) prepared according to (a), were added.

The reaction medium was maintained under agitation and at reflux for 4 h.

In the reaction medium, the cerium (IV) concentration expressed as CeO$_2$, was equal to 62 g/liter and molar ratio [H+]/[Ce$^{IV}$ eq.]was 1.5.

Filtering was on sintered glass No. 4.

A yield of the hydrolysis reaction of 95% was determined.

The product obtained was dried by lyophilization for 24 h in a CHRIST 1060 type lyophilization apparatus.

The lyophilized material was placed in an alumina boat and calcined in a muffle furnace for 6 h at 600° C.

57 g of a yellow precipitate were recovered.

The ceric oxide obtained had the following characteristics:
(1) % CeO$_2$=98%
(2) Mean diameter of the aggregates: 1 μm
(3) Dispersion index: (d$_{84}$−d$_{16}$)/2d$_{50}$=0.4.

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims, including equivalents thereof.

What is claimed is:

1. A process for the preparation of ceric oxide particulates, comprising the steps of (i) hydrolyzing an aqueous solution of a cerium (IV) salt in an acid hydrolysis medium, (ii) adding an aqueous sol comprising an aqueous colloidal dispersion of a cerium (IV) compound to the product of step (i); (iii) separating the precipitate from step (ii); and then (iv) heat treating said precipitate.

2. The process as defined by claim I, said aqueous solution of the cerium (IV) salt comprising an aqueous solution of ceric nitrate.

3. The process as defined by claim 1, said aqueous solution of the cerium (IV) salt comprising a solution emanating from the electrochemical oxidation of a cerous nitrate solution, or a solution produced by the reaction of nitric acid on a hydrated ceric oxide.

4. The process as defined by claim 1, wherein the concentration of the cerium salt solution, expressed as cerium (IV), ranges from 0.3 to 3 moles per liter.

5. The process as defined by claim 1, wherein the acid hydrolysis medium comprises distilled or deionized water.

6. The process as defined by claim 1, wherein the molar ratio [H+]/[Ce$^{IV}$ eq.] is greater than or equal to 0 and less than or equal to 3.

7. The process as defined by claim 6, wherein said ratio ranges from 0 to 2.0.

8. The process as defined by claim 6, wherein acidity of the acid hydrolysis medium is provided by nitric acid.

9. The process as defined by claim 6, wherein acidity of the acid hydrolysis medium is provided by a 0.01 N to 5 N solution of nitric acid.

10. The process as defined by claim 1, wherein the proportion between the aqueous solution of the cerium (IV) salt and the acid hydrolysis medium is such that the final concentration in cerium (IV) ranges from 0.1 to 1.0 mole/liter.

11. The process as defined by claim 10, wherein a final equivalent concentration in cerium (IV) ranges from 0.2 to 0.6 mole/liter.

12. The process as defined by claim 1, wherein the temperature of the acid hydrolysis medium ranges from 70° to 120° C.

13. The process as defined by claim 12, wherein the temperature of the acid hydrolysis medium is its reflux temperature.

14. The process as defined by claim 12, wherein the aqueous solution of the cerium (IV) salt is added all at once, gradually or continuously, to optionally acidified water and heated to the hydrolysis reaction temperature.

15. The process as defined by claim 12, wherein the aqueous solution of the cerium (IV) salt and the acid hydrolysis medium are intimately admixed and said mixture is maintained under agitation at the hydrolysis reaction temperature.

16. The process as defined by claim 12, wherein the aqueous solution of the cerium (IV) salt and the acid hydrolysis medium are simultaneously and continuously intimately admixed and the mixture is heated continuously to the reaction temperature.

17. The process as defined by claim 1, wherein the aqueous colloidal dispersion comprises cerium (IV) values of the general formula (I):

$$Ce\,(M)_z\,(OH)_x\,(NO_3)_y,\,pCeO_2,\,nH_2O \qquad (I)$$

wherein:
M represents an alkali metal or a quaternary ammonium radical;
z ranges from 0 to 0.2;
y ranges from 0 to 1.5;
x is such that $x = 4 - y + z$;
p ranges from 0 to 2.0; and
n ranges from 0 to approximately 20.

18. The process as defined by claim 17, wherein the concentration of the cerium (IV) compound in said colloidal dispersion ranges from 0.1 to 2.5 moles/liter.

19. The process as defined by claim 18, said concentration of the cerium IV compound in said colloidal dispersion ranging from 0.5 to 1 mole/liter.

20. The process as defined by claim 17, wherein the proportion of cerium in the colloidal form to cerium in said dispersion ranges from 99 to 100%.

21. The process as defined by claim 17, wherein the colloids have a mean hydrodynamic diameter ranging from 50 to 2,000 Å.

22. The process as d ®fined by claim 1, wherein the quantity of the aqueous sol of the cerium (IV) compound, expressed relative to the quantity of the cerium (IV) salt expressed as $CeO_2$, ranges from 0.1 to 20% by weight.

23. The process as defined by claim 22, wherein the quantity ranges from 1 to 5% by weight.

24. The process as defined by claim 1, wherein the aqueous sol of the cerium (IV) compound is introduced into a hydrolysis reaction medium heated to at least 70° C.

25. The process as defined by claim 24, wherein said temperature ranges from 75° to 100° C.

26. The process as defined by claim 1, wherein the duration of the hydrolysis reaction ranges from 2 to 8 hours.

27. The process as defined by claim 1, said heat treatment comprising drying the separated precipitate of step (III) in air or under a reduced pressure on the order of 1 to 100 mm of mercury, at a temperature of from 15° to 100° C.

28. The process as defined by claim 27, wherein the duration of drying ranges from 5 to 48 hours.

29. The process as defined by claim 1, comprising drying the separated precipitate of step (iii) by lyophilization.

30. The process as defined by claim 29, said lyophilization comprising freezing at a temperature of from −10° C. to −30° C., followed by sublimation under a reduced pressure of from 0.001 to 0.5 atmosphere.

31. The process as defined by claim 1, said heat treatment comprising a calcination at a temperature of from 300° C. to 1,000° C.

32. The process as defined by claim 31, wherein the temperature of calcination ranges from 350° to 800° C.

33. The process as defined by claim 31, wherein the duration of the calcination ranges from 30 min to 10 hours.

34. The process as defined by claim 1, comprising preparing said aqueous colloidal dispersion of the cerium (IV) compound by dispersing in water a cerium (IV) compound of the formula (II):

$$Ce\,(OH)_x\,(NO)_y,\,pCeO_2,\,nH_2O \qquad (II)$$

wherein:
x is such that $x \times 4 - y$;
y ranges from 0.35 to 1.5;
p is greater than or equal to 0 and less than or equal to 2.0;
n is greater than or equal to 0 and less than or equal to approximately 20.

35. The process as defined by claim 34, comprising preparing said compound (II) by hydrolyzing an aqueous solution of a cerium (IV) salt in an acid medium wherein the molar ratio $[H^+]/[Ce^{IV}\,eq.]$ is greater than or equal to 0 and less than or equal to 3.

36. The process as defined by claim 35 wherein the molar ratio $[H^+]/[Ce^{IV}\,eq.]$ ranges from 0.4 to 2.5.

* * * * *